United States Patent
Matsugi

(10) Patent No.: US 7,272,576 B2
(45) Date of Patent: Sep. 18, 2007

(54) INFORMATION MANAGEMENT SYSTEM FOR MANAGING CONSUMPTION STATUS OF EXPENDABLE CONSUMPTION INFORMATION IN NETWORK PRINTING DEVICES

(75) Inventor: Hironori Matsugi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 934 days.

(21) Appl. No.: 10/449,711

(22) Filed: Jun. 2, 2003

(65) Prior Publication Data
US 2004/0039591 A1    Feb. 26, 2004

(30) Foreign Application Priority Data
May 31, 2002   (JP)   ............................. 2002-159315
May 28, 2003   (JP)   ............................. 2003-151528

(51) Int. Cl.
G06Q 30/00   (2006.01)
(52) U.S. Cl. .......................................... 705/29; 705/26
(58) Field of Classification Search ................ 709/206, 709/220, 223, 224; 358/1.15, 1.14; 705/26, 705/28, 1, 29; 399/10, 23; 347/5
See application file for complete search history.

(56) References Cited

U.S. PATENT DOCUMENTS

2001/0015824 A1 * 8/2001 Maeda ....................... 358/1.15
2001/0016122 A1 * 8/2001 Arima ......................... 399/23
2002/0047871 A1 * 4/2002 Aruga et al. ................... 347/5
2002/0049839 A1 * 4/2002 Miida et al. ................ 709/224
2002/0087350 A1 * 7/2002 Miida et al. ................... 705/1
2002/0099630 A1 * 7/2002 Aruga et al. .................. 705/28
2002/0116480 A1 * 8/2002 Muto ......................... 709/220
2003/0002074 A1 * 1/2003 Miyano ..................... 358/1.15
2003/0139973 A1 * 7/2003 Claremont et al. ........... 705/26
2003/0142338 A1 * 7/2003 Campbell et al. .......... 358/1.14
2003/0229691 A1 * 12/2003 Ishimoto ..................... 709/223
2005/0254830 A1 * 11/2005 Maeda ........................ 399/10

FOREIGN PATENT DOCUMENTS

| JP | 2000-293581 A | 10/2000 |
| JP | 2002-49802 A | 2/2002 |
| JP | 2002-92439 A | 3/2002 |
| JP | 2002-142206 A | 5/2002 |

* cited by examiner

*Primary Examiner*—Le Hien Luu
(74) *Attorney, Agent, or Firm*—Sughrue Mion, PLLC

(57) ABSTRACT

The technique of the present invention reads expendable consumption data regarding expendables consumed by each of printing devices 50a and 50b at regular intervals, sums up consumptions of each expendable with respect to each expendable manufacturer, and sets a convertible point corresponding to the summed-up consumption. The technique then notifies a computer 60a or 60b of each expendable manufacturer of the setting convertible point. This arrangement automatically sets a total point to each expendable manufacturer, based on the consumptions of the respective expendables consumed by the printing devices 50a and 50b.

2 Claims, 11 Drawing Sheets

FIG.3

EXPENDABLE CONSUMPTION DATA

| Printigng Device ID | JA0050a |
|---|---|
| Jurisdiction Management Server ID | CA0040 |
| Data Acquisition Date | Month, Day, Yaer |
| Printer ID | P*****1 |
| Printer ID | P*****2 |
| Consumption of Printing Paper | |
|    Paper(A3/L) by A Corp. | *** |
|    Paper(A4/L) by A Corp. | *** |
|    Paper(A4/M) by B Corp. | *** |
|    Paper(A3/M) by B Corp. | *** |
| Consumption of Ink | |
|    Ink(K) by A Corp. | *** |
|    Ink(C) by A Corp. | *** |
|    Ink(M) by A Corp. | *** |
|    Ink(Y) by A Corp. | *** |

FIG.5

POINT MANAGEMENT DATA

| | |
|---|---|
| Expendable Manufacturer ID | ID * * * * * |
| Data Registration Date | Month, Day, Year |
| Total Point | * * * * |
| Breakdown of Points | |
| Printing Papers | |
| Paper(A3/L) | * * * |
| Paper(A4/L) | * * * |
| Paper(A4/M) | * * * |
| Paper(A3/M) | * * * |
| Inks | |
| Ink(K) | * * * |
| Ink(C) | * * * |
| Ink(M) | * * * |
| Ink(Y) | * * * |

FIG.8

UNIT COST DATA

| Expendables | Unit Cost |
|---|---|
| Paper(A3/L) | * * * |
| Paper(A4/L) | * * * |
| Paper(A4/M) | * * * |
| Paper(A3/M) | * * * |

FIG.9

EXTRA UNIT COST DATA

| Expendables | Extra Unit Cost |
|---|---|
| Paper(A3/L) | * * * |
| Paper(A4/L) | * * * |
| Paper(A4/M) | * * * |
| Paper(A3/M) | * * * |

FIG.10

CHARGE DATA

| | |
|---|---|
| Printing Device ID | JA0050a |
| Data Registration Date | Month, Day, Year |
| Total Charge | * * * * |
| Breakdown of Charges | |
| Paper(A3/L) | * * * |
| Paper(A4/L) | * * * |
| Paper(A4/M) | * * * |
| Paper(A3/M) | * * * |

FIG.11

REBATE DATA

| | |
|---|---|
| Expendable Manufacturer ID | ID * * * * * |
| Data Registration Date | Month, Day, Year |
| Total Rebate | * * * * |
| Breakdown of Rebates | |
| Paper(A3/L) | * * * |
| Paper(A4/L) | * * * |
| Paper(A4/M) | * * * |
| Paper(A3/M) | * * * |

FIG.13

REBATE TABLE

| Paper(A3/L) | |
|---|---|
| Less than * * % | * * * Yen |
| * * % to less than * * % | * * * Yen |
| * * %以上 | * * * Yen |
| Paper(A3/M) | * * * |
| ... | ... |
| ... | ... |
| ... | ... |

INFORMATION MANAGEMENT SYSTEM FOR MANAGING CONSUMPTION STATUS OF EXPENDABLE CONSUMPTION INFORMATION IN NETWORK PRINTING DEVICES

BACKGROUND OF THE INVENTION

1. Field of the Invention

The present invention relates to an information management apparatus for printing devices and a corresponding information management method. More specifically the invention pertains to an information management apparatus for printing devices that manages a consumption status of expendables in multiple printing devices connected with the information management apparatus via a communication line, as well as to a corresponding information management method.

2. Description of the Prior Art

A diversity of information management apparatuses have been proposed to register a point corresponding to an amount of money settled on credit by each registered customer. The information management apparatus sums up the amounts of money settled on credit by each customer for a predetermined time period, for example, for every month, sets a point corresponding to the summed-up amount of money, and adds the newly set point to the existing point with regard to the customer. The accumulated point is generally convertible into an article or a voucher according to the level of the point. A term of validity is set for such conversion.

The prior art information management apparatus calculates and sets points as a point registration service for each customer who makes settlement on credit, but does not make any point registration service to each supplier that supplies expendables used for commodities as the objects of settlement on credit.

SUMMARY OF THE INVENTION

The object of the present invention is thus to automatically set a predetermined service or a rebate to a supply source of an expendable consumed in the process of printing with printing devices in an information management apparatus for printing devices and a corresponding information management method. The object of the invention is also to automatically set a predetermined service or a rebate corresponding to a consumption of an expendable consumed in the process of printing with printing devices to a supply source of the consumed expendable in the information management apparatus for printing devices and the corresponding information management method.

In order to achieve at least a part of the aforementioned objects, the information management apparatus for printing devices and information management method of the present invention are structured as follows.

A first information management apparatus for printing devices of the present invention is an apparatus that manages a consumption status of an expendable in multiple printing devices, which are connected with the information management apparatus via a communication line, the information management apparatus including: an information storage module that stores information; a receiver-transmitter module that receives and transmits information via the communication line; an information reception and storage control module that actuates the receiver-transmitter module to receive expendable consumption information from the multiple printing devices via the communication line and stores the received expendable consumption information into the information storage module, where the expendable consumption information includes printing device identification information used for identifying each of the multiple printing devices and consumption information regarding a consumption of each expendable consumed by each of the multiple printing devices with regard to each supply source; and a predetermined service setting control module that reads the expendable consumption information from the information storage module, sets a specification of a predetermined service to each supply source based on the consumption information on the consumption of each expendable with regard to the supply source, which is included in the read expendable consumption information, maps the setting specification of the predetermined service to the corresponding supply source, and stores the mapping into the information storage module.

The first information management apparatus for printing devices of the present invention receives and stores the expendable consumption information from the multiple printing devices via the communication line. Here the expendable consumption information includes printing device identification information used for identifying each of the multiple printing devices and consumption information regarding a consumption of each expendable consumed by each of the multiple printing devices with regard to each supply source. The first information management apparatus reads the stored expendable consumption information and sets and stores a specification of a predetermined service to each supply source, based on the consumption information on the consumption of each expendable with regard to the supply source. This arrangement automatically sets a predetermined service to each expendable supply source, based on the expendable consumption information regarding the expendable consumed in the process of printing with the multiple printing devices.

In the first information management apparatus for printing devices of the present invention, as one aspect, the supply source may be either one of an expendable manufacturer and an expendable supplier. In the first information management apparatus for printing devices, the information reception and storage control module may receive and store the expendable consumption information at every preset time interval, and receive and store the expendable consumption information, when the receiver-transmitter module receives a request of transmitting the expendable consumption information from each of the printing devices. In the first information management apparatus for printing devices of the present invention, the predetermined service setting control module may compile a consumption of each expendable with respect to each supply source based on the expendable consumption information, and set the specification of the predetermined service to the supply source according to the compiled consumption. In this case, the predetermined service setting control module may set the specification of the predetermined service to each supply source to be proportional to the consumption of each expendable compiled with regard to the supply source. The predetermined service setting control module may further set a numerical point convertible to either of an article and money as the specification of the predetermined service, and set an amount of money to be paid to each supply source of the expendable as the specification of the predetermined service. The predetermined service setting control module may read the expendable consumption information and set the specification of the predetermined service at every preset time interval.

The first information management apparatus for printing devices of the present invention, as another aspect, may include a predetermined service transmission control module that reads the specification of the predetermined service, which has been mapped to each supply source of the expendable and has been stored in the information storage module, at every preset time interval and controls the receiver-transmitter module to transmit the read specification of the predetermined service to a computer of the corresponding supply source of the expendable via the communication line. The first information management apparatus of the present invention may further include a request acceptance control module that, when the receiver-transmitter module receives a transmission request of the specification of the predetermined service from a computer of each supply source of the expendable via the communication line, reads the specification of the predetermined service mapped to the supply source of the expendable, which has output the request, from the information storage module, and controls the receiver-transmitter module to transmit the read specification of the predetermined service to the computer of the supply source of the expendable, which has output the request.

A second information management apparatus for printing devices of the present invention is an apparatus that manages a consumption status of an expendable in multiple printing devices connecting with the information management apparatus via a communication line, the information management apparatus including: an information storage module that stores accounting information as part of information stored therein, where the accounting information includes a unit cost used for calculating a charge for printing with each of the multiple printing devices and a unit rebate used for calculating a rebate for consumption of the expendable to each expendable supply source; a receiver-transmitter module that receives and transmits information via the communication line; an information reception and storage control module that actuates the receiver-transmitter module to receive expendable consumption information from the multiple printing devices via the communication line and stores the received expendable consumption information into the information storage module, where the expendable consumption information includes printing device identification information used for identifying each of the multiple printing devices and consumption information regarding a consumption of each expendable consumed by each of the multiple printing devices with regard to each supply source; and a rebate calculation module that reads the expendable consumption information stored in the information storage module, calculates a charge to each printing device and a rebate to each expendable supply source, based on the consumption of each expendable with respect to each expendable supply source included in the expendable consumption information and the accounting information stored in the information storage module, and stores the calculated charge mapped to the printing device identification information of the corresponding printing device, as well as the calculated rebate mapped to the corresponding expendable supply source, into the information storage module.

The second information management apparatus for printing devices of the present invention stores in advance the accounting information into the information storage module. Here the accounting information includes a unit cost used for calculating a charge for printing with each of the multiple printing devices and a unit rebate used for calculating a rebate for consumption of the expendable to each expendable supply source. The second information management apparatus receives and stores the expendable consumption information from the multiple printing devices via the communication line. Here the expendable consumption information includes printing device identification information used for identifying each of the multiple printing devices and consumption information regarding a consumption of each expendable consumed by each of the multiple printing devices with regard to each expendable supply source. The second information management apparatus reads the stored expendable consumption information, calculates a charge to each printing device and a rebate to each expendable supply source, based on the consumption of each expendable with respect to each expendable supply source and the accounting information stored in the information storage module, and stores the calculated charge mapped to the printing device identification information of the corresponding printing device, as well as the calculated rebate mapped to the corresponding expendable supply source. This arrangement automatically sets the charge to each printing device and the rebate to each expendable supply source, based on the expendable consumption information regarding the expendable consumed in the process of printing with the multiple printing devices.

In the second information management apparatus for printing devices of the present invention, as one aspect, the rebate calculation module may use the unit rebate as an extra value of the unit cost.

A third information management apparatus for printing devices of the present invention is an apparatus that manage a consumption status of an expendable in multiple printing devices connecting with the information management apparatus via a communication line, the information management apparatus including: an information storage module that stores rebate information regarding a rebate corresponding to a consumption ratio to a total consumption with regard to each expendable, as part of information stored therein; a receiver-transmitter module that receives and transmits information via the communication line; an information reception and storage control module that actuates the receiver-transmitter module to receive expendable consumption information regarding a consumption of each expendable consumed by each of the multiple printing devices, from the multiple printing devices via the communication line and stores the received expendable consumption information into the information storage module; and a rebate calculation module that reads the expendable consumption information stored in the information storage module, calculates a rebate to each expendable supply source based on the expendable consumption information and the rebate information stored in the information storage module, and stores the calculated rebate mapped to the corresponding expendable supply source into the information storage module.

The third information management apparatus for printing devices of the present invention stores in advance the rebate information regarding a rebate corresponding to a consumption ratio to a total consumption with regard to each expendable, into the information storage module. The third information management apparatus receives and stores the expendable consumption information regarding the consumption of each expendable consumed by each of the multiple printing devices, from the multiple printing devices via the communication line. The third information management apparatus reads the stored expendable consumption information, calculates a rebate to each expendable supply source based on the expendable consumption information and the rebate information stored in the information storage module, and stores the calculated rebate mapped to the corresponding expendable supply source. This arrangement automatically sets the rebate to each expendable supply source, based on the expendable consumption information regarding the expendable consumed in the process of printing with the multiple printing devices.

In the third information management apparatus for printing devices of the present invention, as one aspect, the rebate calculation module may sum up consumptions of each expendable with respect to each expendable supply source and compile a total consumption of the expendable, based on the expendable consumption information, calculate a ratio of the summed-up consumption of each expendable with respect to each expendable supply source to the compiled total consumption of the expendable, and refer to the rebate information to specify a rebate corresponding to the calculated ratio.

A fourth information management apparatus for printing devices of the present invention is an apparatus that manages a consumption status of an expendable in multiple printing devices connecting with the information management apparatus via a communication line, the information management apparatus including: an information storage module that stores unit rebate information as part of information stored therein, where the unit rebate information includes a unit rebate used for calculating a rebate for consumption of the expendable to each expendable supply source; a receiver-transmitter module that receives and transmits information via the communication line; an information reception and storage control module that actuates the receiver-transmitter module to receive expendable consumption information regarding a consumption of each expendable consumed by each of the multiple printing devices with regard to each supply source, from the multiple printing devices via the communication line and stores the received expendable consumption information into the information storage module; and a rebate calculation module that reads the expendable consumption information stored in the information storage module, calculates a rebate to each expendable supply source, based on the expendable consumption information and the unit rebate information stored in the information storage module, and stores the calculated rebate mapped to the corresponding expendable supply source, into the information storage module.

The fourth information management apparatus for printing devices of the present invention stores in advance the unit rebate information, which includes a unit rebate used for calculating a rebate for consumption of the expendable to each expendable supply source, into the information storage module. The fourth information management apparatus receives and stores the expendable consumption information regarding the consumption of each expendable consumed by each of the multiple printing devices with regard to each expendable supply source, from the multiple printing devices via the communication line. The fourth information management apparatus reads the stored expendable consumption information, calculates a rebate to each expendable supply source based on the expendable consumption information and the unit rebate information stored in the information storage module, and stores the calculated rebate mapped to the corresponding expendable supply source. This arrangement automatically sets the rebate to each expendable supply source, based on the expendable consumption information regarding the expendable consumed in the process of printing with the multiple printing devices.

In one preferable application of any of the second through the fourth information management apparatuses for printing devices of the present invention, the rebate calculation module may calculate the rebate to each expendable supply source at every preset time interval. In another preferable application, any of the information management apparatuses may further include a rebate transmission control module that reads the rebate stored and mapped to each expendable supply source from the information storage module at every preset time interval and controls the receiver-transmitter module to transmit the read-out rebate to a computer of the corresponding expendable supply source via the communication line, and a request acceptance control module that, when the receiver-transmitter module receives a transmission request of the rebate from a computer of each supply source of the expendable via the communication line, reads a rebate mapped to the supply source of the expendable, which has output the request, from the information storage module, and controls the receiver-transmitter module to transmit the read rebate to the computer of the supply source of the expendable, which has output the request.

A first information management method for printing devices of the present invention causes a computer equipped with an information storage module that stores information and a receiver-transmitter module that receives and transmits information via a communication line to manage a consumption status of an expendable in multiple printing devices connecting with the computer via the communication line, the information management method including the steps of: (a) actuating the receiver-transmitter module to receive expendable consumption information from the multiple printing devices via the communication line and storing the received expendable consumption information into the information storage module, where the expendable consumption information includes printing device identification information used for identifying each of the multiple printing devices and consumption information regarding a consumption of each expendable consumed by each of the multiple printing devices with regard to each supply source; (b) reading the expendable consumption information from the information storage module, setting a specification of a predetermined service to each supply source based on the consumption information on the consumption of each expendable with regard to the supply source, which is included in the read expendable consumption information, mapping the setting specification of the predetermined service to the corresponding supply source, and storing the mapping into the information storage module; and (c) reading a predetermined service mapped to each expendable supply source from the information storage module at a preset timing and actuating the receiver-transmitter module to transmit a specification of the predetermined service to a computer of the corresponding expendable supply source via the communication line.

The first information management method of the present invention receives and stores the expendable consumption information from the multiple printing devices via the communication line. Here the expendable consumption information includes printing device identification information used for identifying each of the multiple printing devices and consumption information regarding a consumption of each expendable consumed by each of the multiple printing devices with regard to each expendable supply source. The first information management method reads the stored expendable consumption information and sets and stores a specification of a predetermined service to each expendable supply source, based on the consumption information on the consumption of each expendable with regard to the expendable supply source. The first information management method reads the specification of the predetermined service stored and mapped to each expendable supply source from the information storage module at a preset timing, and transmits the read-out specification of the predetermined service to the computer of the corresponding expendable supply source via the communication line. This arrangement automatically sets a predetermined service to each expendable supply source, based on the expendable consumption information regarding the expendable consumed in the process of printing with the multiple printing devices and notifies the expendable supply source of the predetermined service.

A second information management method for printing devices of the present invention causes a computer equipped with an information storage module that stores information and a receiver-transmitter module that receives and transmits information via a communication line to manage a consumption status of an expendable in multiple printing devices connecting with the computer via the communication line, the information management method including the steps of: (a) storing accounting information into the information storage module, where the accounting information includes a unit cost used for calculating a charge for printing with each of the multiple printing devices and a unit rebate used for calculating a rebate for consumption of the expendable to each expendable supply source; (b) actuating the receiver-transmitter module to receive expendable consumption information from the multiple printing devices via the communication line and storing the received expendable consumption information into the information storage module, where the expendable consumption information includes printing device identification information used for identifying each of the multiple printing devices and consumption information regarding a consumption of each expendable consumed by each of the multiple printing devices with regard to each supply source; (c) reading the expendable consumption information stored in the information storage module, calculating a charge to each printing device and a rebate to each expendable supply source, based on the consumption of each expendable with respect to each expendable supply source included in the expendable consumption information and the accounting information stored in the information storage module, and storing the calculated charge mapped to the printing device identification information of the corresponding printing device, as well as the calculated rebate mapped to the corresponding expendable supply source, into the information storage module; and (d) reading a rebate mapped to each expendable supply source from the information storage module at a preset timing, and actuating the receiver-transmitter module to transmit the rebate to a computer of the corresponding expendable supply source via the communication line.

The second information management method for printing devices of the present invention stores in advance the accounting information into the information storage module. Here the accounting information includes a unit cost used for calculating a charge for printing with each of the multiple printing devices and a unit rebate used for calculating a rebate for consumption of the expendable to each expendable supply source. The second information management method receives and stores the expendable consumption information from the multiple printing devices via the communication line. Here the expendable consumption information includes printing device identification information used for identifying each of the multiple printing devices and consumption information regarding a consumption of each expendable consumed by each of the multiple printing devices with regard to each expendable supply source. The second information management method reads the stored expendable consumption information, calculates a charge to each printing device and a rebate to each expendable supply source, based on the consumption of each expendable with respect to each expendable supply source and the accounting information stored in the information storage module, and stores the calculated charge mapped to the printing device identification information of the corresponding printing device, as well as the calculated rebate mapped to the corresponding expendable supply source. The second information management method also reads the rebate mapped to each expendable supply source from the information storage module at a preset timing, and actuates the receiver-transmitter module to transmit the rebate to a computer of the corresponding expendable supply source via the communication line. This arrangement automatically sets and notifies the charge to each printing device and the rebate to each expendable supply source, based on the expendable consumption information regarding the expendable consumed in the process of printing with the multiple printing devices.

A third information management method for printing devices of the present invention causes a computer equipped with an information storage module that stores information and a receiver-transmitter module that receives and transmits information via a communication line to manage a consumption status of an expendable in multiple printing devices connecting with the computer via the communication line, the information management method including the steps of: (a) storing rebate information regarding a rebate corresponding to a consumption ratio to a total consumption with regard to each expendable into said information storage module; (b) actuating the receiver-transmitter module to receive expendable consumption information regarding a consumption of each expendable consumed by each of the multiple printing devices, from the multiple printing devices via the communication line and storing the received expendable consumption information into the information storage module; (c) reading the expendable consumption information stored in the information storage module, calculating a rebate to each expendable supply source based on the expendable consumption information and the rebate information stored in the information storage module, and storing the calculated rebate mapped to the corresponding expendable supply source into the information storage module; and (d) reading a rebate mapped to each expendable supply source from the information storage module at a preset timing, and actuating the receiver-transmitter module to transmit the rebate to a computer of the corresponding expendable supply source via the communication line.

The third information management method for printing devices of the present invention stores in advance the rebate information regarding a rebate corresponding to a consumption ratio to a total consumption with regard to each expendable, into the information storage module. The third information management method receives and stores the expendable consumption information regarding the consumption of each expendable consumed by each of the multiple printing devices, from the multiple printing devices via the communication line. The third information management method reads the stored expendable consumption information, calculates a rebate to each expendable supply source based on the expendable consumption information and the rebate information stored in the information storage module, and stores the calculated rebate mapped to the corresponding expendable supply source. The third information management method also reads the rebate mapped to each expendable supply source from the information storage module at a preset timing, and actuates the receiver-transmitter module to transmit the rebate to a computer of the corresponding expendable supply source via the communication line. This arrangement automatically sets the charge to each printing device and the rebate to each expendable supply source, based on the expendable consumption information regarding the expendable consumed in the process of printing with the multiple printing devices. Here 'each expendable' represents each finely classified type of expendable, each moderately classified variation of expendable, or each roughly classified class of expendable.

A fourth information management method for printing devices of the present invention causes a computer equipped with an information storage module that stores information and a receiver-transmitter module that receives and transmits information via a communication line to manage a consumption status of an expendable in multiple printing devices connecting with the computer via the communication line, the information management method including the steps of: (a) storing unit rebate information which includes a unit rebate used for calculating a rebate for consumption of the expendable to each expendable supply source into said information storage module; (b) actuating the receiver-transmitter module to receive expendable consumption information regarding a consumption of each expendable consumed by each of the multiple printing devices with regard to each supply source, from the multiple printing devices via the communication line and storing the received expendable consumption information into the information storage module, where the expendable consumption information; (c) reading the expendable consumption information stored in the information storage module, calculating a rebate to each expendable supply source, based on the expendable consumption information and the unit rebate information stored in the information storage module, and storing the calculated rebate mapped to the corresponding expendable supply source, into the information storage module; and (d) reading a rebate mapped to each expendable supply source from the information storage module at a preset timing, and actuating the receiver-transmitter module to transmit the rebate to a computer of the corresponding expendable supply source via the communication line.

The fourth information management method for printing devices of the present invention stores in advance the unit rebate information, which includes a unit rebate used for calculating a rebate for consumption of the expendable to each expendable supply source, into the information storage module. The fourth information management method receives and stores the expendable consumption information regarding the consumption of each expendable consumed by each of the multiple printing devices with regard to each expendable supply source, from the multiple printing devices via the communication line. The fourth information management method reads the stored expendable consumption information, calculates a rebate to each expendable supply source based on the expendable consumption information and the unit rebate information stored in the information storage module, and stores the calculated rebate mapped to the corresponding expendable supply source. The fourth information management method also reads a rebate mapped to each expendable supply source from the information storage module at a preset timing, and actuates the receiver-transmitter module to transmit the rebate to a computer of the corresponding expendable supply source via the communication line. This arrangement automatically sets and notifies the rebate to each expendable supply source, based on the expendable consumption information regarding the expendable consumed in the process of printing with the multiple printing devices.

A fifth information management apparatus for printing devices of the present invention is an apparatus that manages a consumption status of an expendable in multiple printing devices connecting with the information management apparatus via a communication line, the information management apparatus including: an expendable consumption information reception module that receives expendable consumption information regarding the expendable consumed by the multiple printing devices; and a predetermined service setting module that sets a predetermined service to a supplier of the consumed expendable, based on the received expendable consumption information.

The fifth information management apparatus for printing devices of the present invention receives the expendable consumption information regarding the consumed expendable from the multiple printing devices connected via the communication line and sets a predetermined service to a supplier of the consumed expendable, based on the received expendable consumption information. This arrangement automatically sets a predetermined service to the supplier of the expendable, based on the expendable consumption information regarding the expendable consumed in the process of printing with the multiple printing devices.

In the fifth information management apparatus for printing devices of the invention, as one aspect, the expendable consumption information may include information regarding a supplier of each expendable. Here, the expendable consumption information may include information that is used for identifying a supplier of each expendable and is input from the expendable to be consumed in the process of printing with the multiple printing devices. In the fifth information management apparatus for printing devices of the invention, the predetermined service setting module may compile a consumption of the expendable with respect to each supplier based on the received expendable consumption information, and set the predetermined service according to the compiled consumption. Here, the predetermined service setting module may set the predetermined service that is more advantageous to each supplier according to a greater value of the compiled consumption of the expendable. Further, the predetermined service setting control module may set a numerical point convertible to either of an article and money as the specification of the predetermined service and set an amount of money to be paid to each supplier as the specification of the predetermined service. Still further, the predetermined service setting module may set the predetermined service at every preset time interval. This arrangement ensures setting the predetermined service at every preset time interval.

The fifth information management apparatus for printing devices of the present invention, as another aspect, may include: a service specification output module that outputs either of a document and a display window including a specification of the setting of the predetermined service via the communication line to a computer of a supplier that receives the predetermined service; and a service specification output module that outputs, in response to a request from a supplier that receives the predetermined service, either of a document and a display window including a specification of the setting of the predetermined service via the communication line to a computer of the supplier.

A fifth information management method of the present invention manages a consumption status of an expendable in multiple printing devices connected via a communication line, the information management method including the steps of: (a) receiving expendable consumption information regarding the expendable consumed by the multiple printing devices; (b) setting a predetermined service to a supplier of the consumed expendable, based on the received expendable consumption information; and (c) notifying a corresponding supplier of a specification of the setting of the predetermined service.

The fifth information management method of the present invention automatically sets a predetermined service to the supplier of the expendable, based on the expendable consumption information regarding the expendable consumed in the process of printing with the multiple printing devices, and notifies the corresponding supplier of the setting specification of the predetermined service.

A first storage medium of the present invention is a storage medium in which a computer program is stored, the computer program being executed by an information management apparatus, which is equipped with an information storage module that stores information and a receiver-transmitter module that receives and transmits information via a communication line and manages a consumption status of an expendable in multiple printing devices connected with the information management apparatus via the communication line, the program including: a module that actuates the receiver-transmitter module to receive expendable consumption information from the multiple printing devices via the communication line and stores the received expendable consumption information into the information storage module, where the expendable consumption information includes printing device identification information used for identifying each of the multiple printing devices and consumption information regarding a consumption of each expendable consumed by each of the multiple printing devices with regard to each supply source; and a module that reads the expendable consumption information from the information storage module, sets a specification of a predetermined service to each supply source based on the consumption information on the consumption of each expendable with regard to the supply source, which is included in the read expendable consumption information, maps the setting specification of the predetermined service to the corresponding supply source, and stores the mapping into the information storage module.

The first storage medium of the invention causes the program stored therein to be executed by the information management apparatus for printing devices. The program is executed to receive and store the expendable consumption information from the multiple printing devices via the communication line. Here the expendable consumption information includes printing device identification information used for identifying each of the multiple printing devices and consumption information regarding a consumption of each expendable consumed by each of the multiple printing devices with regard to each supply source. The program is also executed to read the stored expendable consumption information and set and store a specification of a predetermined service to each supply source, based on the consumption information on the consumption of each expendable with regard to the supply source. This arrangement automatically sets a predetermined service to each supply source, based on the expendable consumption information regarding the expendable consumed in the process of printing with the multiple printing devices.

A second storage medium of the present invention in which a computer program is stored, the computer program being executed by an information management apparatus for printing devices, which manages a consumption status of an expendable in multiple printing devices connected with the information management apparatus via a communication line, the program including: a module that receives expendable consumption information regarding the expendable consumed by the multiple printing devices; and a module that sets a predetermined service to a supplier of the consumed expendable, based on the received expendable consumption information.

The second storage medium of the invention causes the program stored therein to be executed by the information management apparatus for printing devices. The program is executed to receive the expendable consumption information regarding the consumed expendable from the multiple printing devices connected via the communication line and set a predetermined service to a supplier of the consumed expendable, based on the received expendable consumption information. This arrangement automatically sets a predetermined service to each supply source, based on the expendable consumption information regarding the expendable consumed in the process of printing with the multiple printing devices.

BRIEF DESCRIPTION OF THE DRAWINGS

FIG. 3 shows an example of the expendable consumption data;

FIG. 5 shows one example of point management data;

FIG. 8 shows one example of the unit cost data;

FIG. 9 shows one example of the extra unit cost data;

FIG. 10 shows one example of the charge data;

FIG. 11 shows one example of the rebate data;

FIG. 13 shows one example of the rebate table.

DESCRIPTION OF THE PREFERRED EMBODIMENTS

Figure 1:
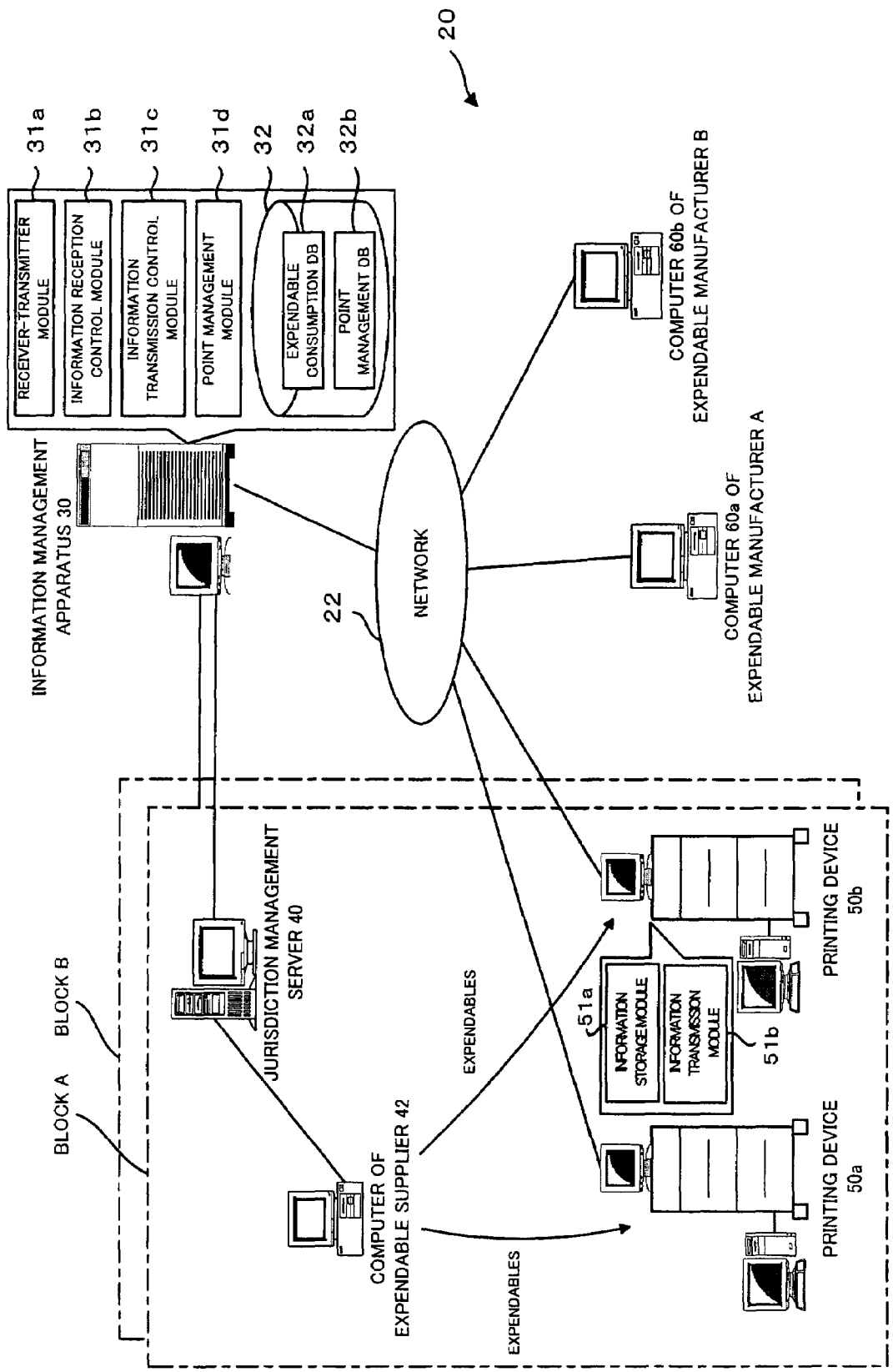
FIG. 1 schematically illustrates the construction of a printing management system 20 including an information management apparatus 30 in one embodiment of the invention.

Preferred embodiments of the present invention are discussed below. FIG. 1 schematically illustrates the construction of a printing management system 20 including an information management apparatus 30 in one embodiment of the invention. As illustrated, the information management apparatus 30 of the embodiment has an external storage device 32, such as a hard disk drive, in which an expendable consumption database 32a that stores data regarding consumption of expendables (hereafter referred to as expendable consumption data) in multiple printing devices 50a and 50b in the form of a database and a point management database 32b that stores data used for management of points convertible to expendable manufacturers in the form of a database are constructed. The information management apparatus 30 also includes an information reception control module 31b that receives the expendable consumption data at regular intervals via a receiver-transmitter module 31a from the multiple printing devices 50a and 50b, which are connected with the information management apparatus 30 via a network 22, and registers the received expendable consumption data into the expendable consumption database 32a, and an information transmission control module 31c that transfers the expendable consumption data registered in the expendable consumption database 32a to a jurisdiction management server 40, which manages supplies of the expendables to the multiple printing devices 50a and 50b. The information management apparatus 30 further includes a point management module 31d that sets points convertible to expendable manufacturers, which manufacture expendables and deliver the manufactured expendables to an expendable supplier, based on the expendable consumption data, registers the settings of the convertible points into the point management database 32b, and transmits the registered convertible points to computers 60a and 60b of the expendable manufacturers connecting with the information management apparatus 30 via the network 22.

The jurisdiction management server 40 functions to manage supplies of expendables to the printing devices 50a and 50b, which are located at photo studios in each of geographical blocks (for example, a block A and a block B in the illustrated example). The jurisdiction management server 40 gives a supply instruction to a computer 42 of the expendable supplier, which supplies expendables, such as printing papers and printing inks, to keep predetermined stocks at each photo studio, based on the expendable consumption data transferred from the information management apparatus 30. The series of processing executed by the jurisdiction management server 40 is not the essential part of the present invention and is thus not described in detail here. The following describes the series of processing executed by the information management apparatus 30 of the embodiment.

Each of the printing devices 50a and 50b includes multiple ink jet printers that is capable of high-performance photographic printing and settles a schedule to specify a printer used for each print job transmitted from a computer connected via a LAN. Each of the printing devices 50a and 50b includes an information storage module 51a that stores a printing device ID utilized for identification of the printing device, a jurisdiction management server ID utilized for identification of the jurisdiction management server having jurisdiction over the printing device, and the expendable consumption data including a consumption of each expendable consumed for printing. The printing device 50a or 50b also has an information transmission module 51b that transmits the expendable consumption data, together with the printing device ID and the jurisdiction management server ID, to the information management apparatus 30 at preset time intervals (for example, at every 24 hours), in response to a request from the information management apparatus 30 or in response to a request from each of the printing devices 50a and 50b.

Figure 2:
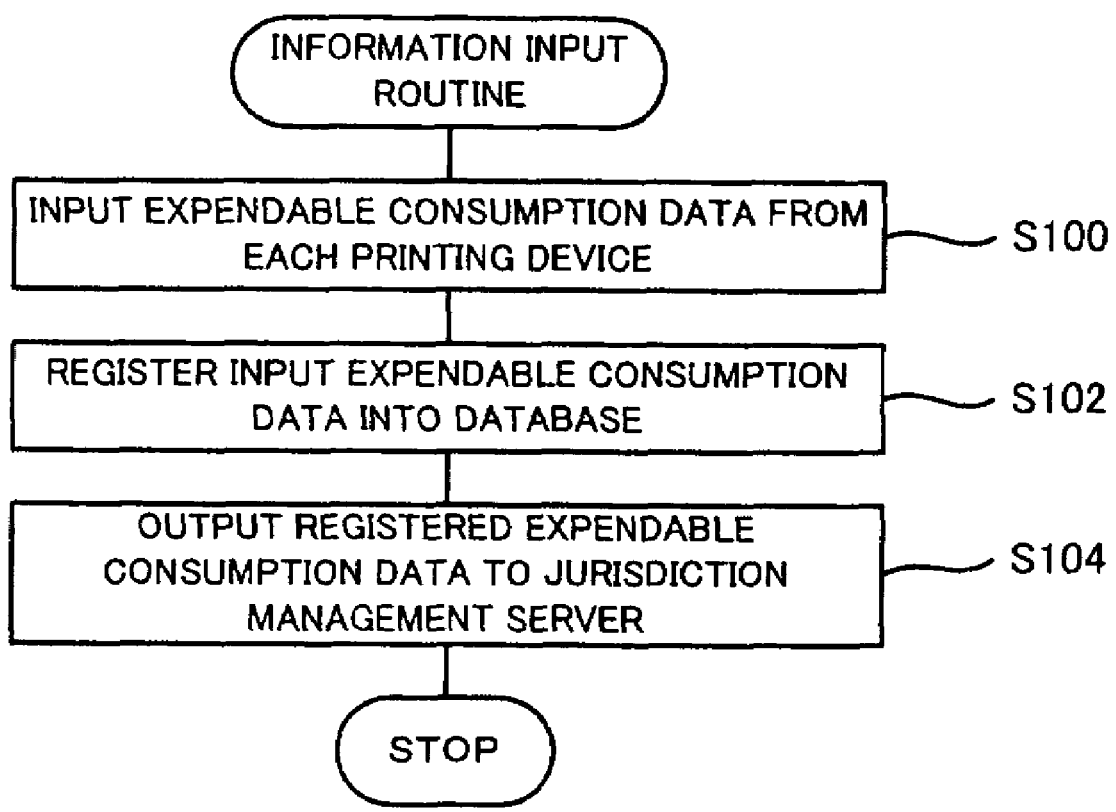
FIG. 2 is a flowchart showing an information input routine executed by the information management apparatus 30 of the embodiment.

FIG. 2 is a flowchart showing an information input routine executed by the information management apparatus 30 of the embodiment. This information input routine is carried out iteratively at preset time intervals (for example, at every 24 hours). When the program enters the information input routine, the information management apparatus 30 of the embodiment first inputs the expendable consumption data from each of the printing devices 50a and 50b in all geographical blocks connecting with the information management apparatus 30 via the network 22 (step S100). FIG. 3 shows an example of the expendable consumption data. As shown in FIG. 3, the expendable consumption data of the embodiment includes the printing device ID, the jurisdiction management server ID, a data acquisition date as the information input date from the printing device, a printer ID allocated to each printer incorporated in the printing device, a printing paper consumption with regard to each manufacturer, each paper size, and each paper type, and an ink consumption with regard to each manufacturer and each color. The printing device 50a or 50b may read identification information (for example, identification information in the form of a barcode) attached to a marginal space of the printing paper in the process of printing an image and set the identification information as part of the expendable consumption data regarding the printing paper consumption. Information on the manufacturer, the paper size, and the paper type input by an operator into the printing device 50a or 50b at the time of setting the printing paper in the printing device 50a or 50b may otherwise be set as part of the expendable consumption data regarding the printing paper consumption. The printing device 50a or 50b may read identification information of the manufacturer (for example, manufacturer information stored in a storage element) stored in an ink cartridge in the process of printing an image and set the identification information, together with an estimated consumption of each color ink used for printing the image, as part of the expendable consumption data.

After reading the expendable consumption data, the information management apparatus 30 registers the input expendable consumption data into the expendable consumption database 32a (step S102). The registered expendable consumption data are output to the jurisdiction management server 40 having an allocated ID identical with the input jurisdiction management server ID (step S104). The program then exits from this information input routine. As described above, the jurisdiction management server 40 obtains the expendable consumption data from the information management apparatus 30 and manages supplies of expendables by the expendable supplier to the photo studios, at which the printing devices are located, in the block under jurisdiction based on the obtained expendable consumption data.

Figure 4:
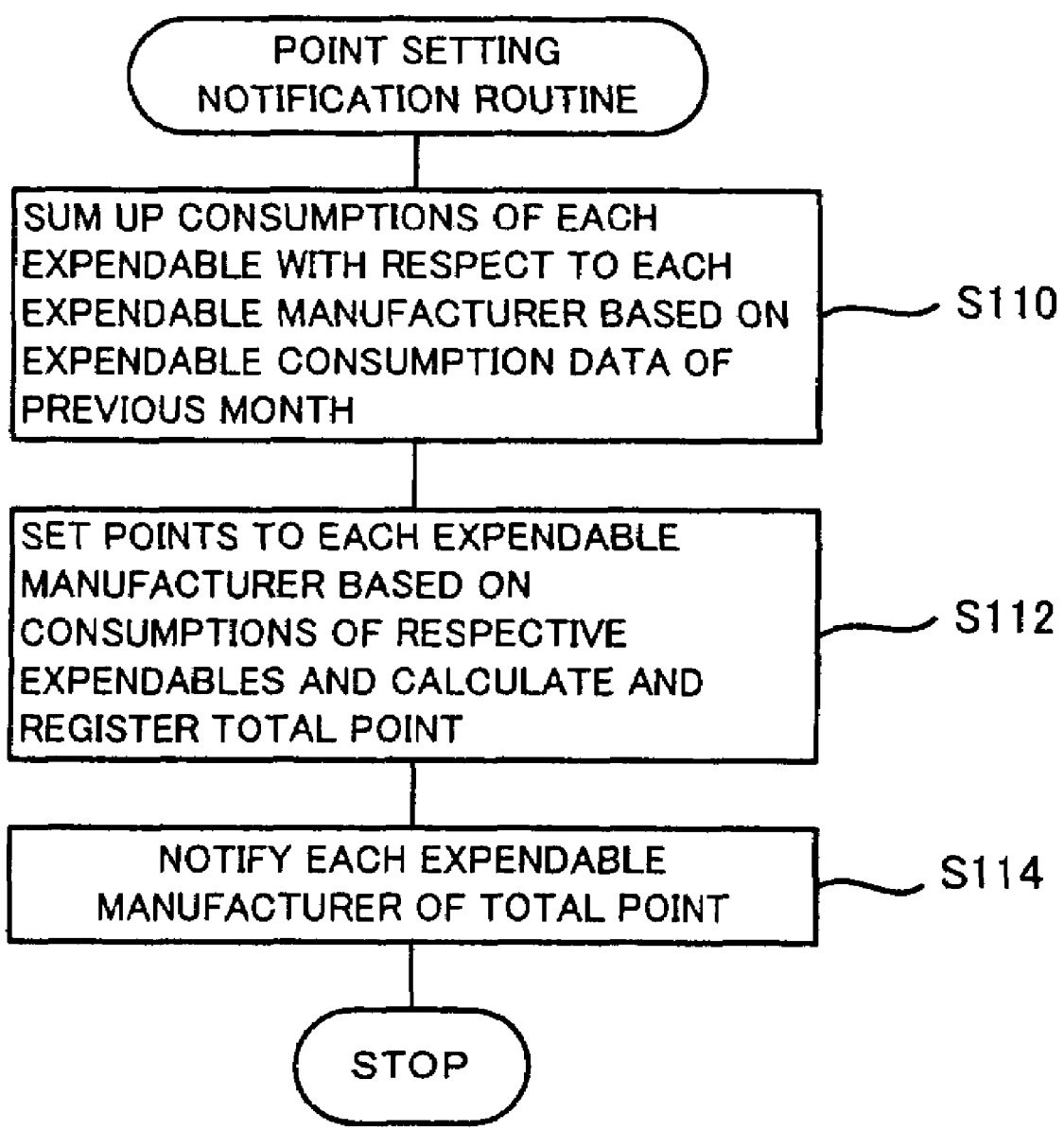
FIG. 4 is a flowchart showing a point setting notification routine executed by the information management apparatus 30 of the embodiment.

FIG. 4 is a flowchart showing a point setting notification routine executed by the information management apparatus 30 of the embodiment. This routine is carried out on the 1$^{st}$ day of every month. When the program enters the point setting notification routine, the information management apparatus 30 of the embodiment first sums up the consumptions of each expendable with respect to each expendable manufacturer, based on the expendable consumption data of a previous month registered in the expendable consumption database 32a (step S110). For example, the procedure calculates the consumptions of the respective expendables manufactured by an expendable manufacturer A as * sheets of size A4 luster paper, * sheets of size A3 luster paper,  liters of ink (K),  liters of ink (C),  liters of ink (M), and  liters of ink (Y). The information management apparatus 30 sets points to each expendable manufacturer, based on the consumptions of the respective expendables calculated with respect to each expendable manufacturer, compiles a total point to the expendable manufacturer, and registers the total point into the point management database 32b (step S112). The point setting process allocates point conversion factors to respective expendables, for example, 1 point to 100 sheets of size A4 luster paper, 1 point to 100 sheets of size A4 matt paper, and 20 points to 1 liter of every color ink, and multiplies the calculated consumption of each expendable by the point conversion factor. FIG. 5 shows an example of point management data. The point management data includes an ID utilized for identification of the expendable manufacturer (expendable manufacturer ID), a data registration date when the data is registered in the point management database 32b, a total point, and a breakdown of points with regard to the respective expendables.

The point management data registered in the point management database 32b is transmitted to the computer 60a or 60b of each corresponding expendable manufacturer connected via the network 22 (step S114). The program then exits from the point setting notification routine. The procedure of this embodiment sets the point of the transmitted point management data as a service converted at a preset rate and remitted to the corresponding expendable manufacturer. The expendable manufacturer receiving the notification of the point gains the sum of money corresponding to the notified point. This service encourages the expendable manufacturer to promote further consumption of the expendables and recommend printing with the printing devices 50a and 50b in the printing management system 20 of the embodiment. Notification of the point to the computer 60a or 60b of the corresponding expendable manufacturer may be implemented by simple transfer of data, by creation and transmission of an electronic document, or by any other suitable technique.

As described above, the information management apparatus 30 of the embodiment automatically offers the point registration service as the predetermined service to each expendable manufacturer, based on the expendable consumption data regarding the expendables consumed in the process of printing with the multiple printing devices 50a and 50b located at different places. The point registration service is given to the expendable manufacturer according to the consumed quantity of each expendable. This point registration service desirably enhances the efficiency of the system.

The information management apparatus 30 of the embodiment sums up the points with respect to each expendable manufacturer and notifies the expendable manufacturer of the total point once a month. The frequency of summation is not restricted to once a month, but the calculation may be performed at any desired frequency. It is not necessary to notify the expendable manufacturer of the total point every time the summation is carried out. The notification may be carried out at another frequency at different timings.

The information management apparatus 30 of the embodiment multiplies the consumption of each ink as an expendable by a conversion rate to calculate a point and sums up the calculated points. One possible modification may accumulate the consumption by the unit of ink cartridge and multiplies the number of consumed ink cartridges by a preset conversion rate, so as to calculate the total point.

The information management apparatus 30 of the embodiment sets the convertible point as the service offered to each expendable manufacturer. One possible modification may set an inconvertible point as the service to each expendable manufacturer. Another possible modification may directly set an amount of money to be paid to each expendable manufacturer, instead of the point.

The information management apparatus 30 of the embodiment notifies the calculated total point to the computer 60a or 60b of the corresponding expendable manufacturer via the network 22. One modified procedure may notify each expendable manufacturer of the calculated total point by post or by another suitable technique.

The information management apparatus 30 of the embodiment sets the point as the service to the expendable manufacturer. The point may otherwise be set as the service to the expendable supplier. In this case, the point may be convertible or inconvertible. The point may also be replaced by an amount of money directly set to be paid to the expendable supplier.

Figure 6:
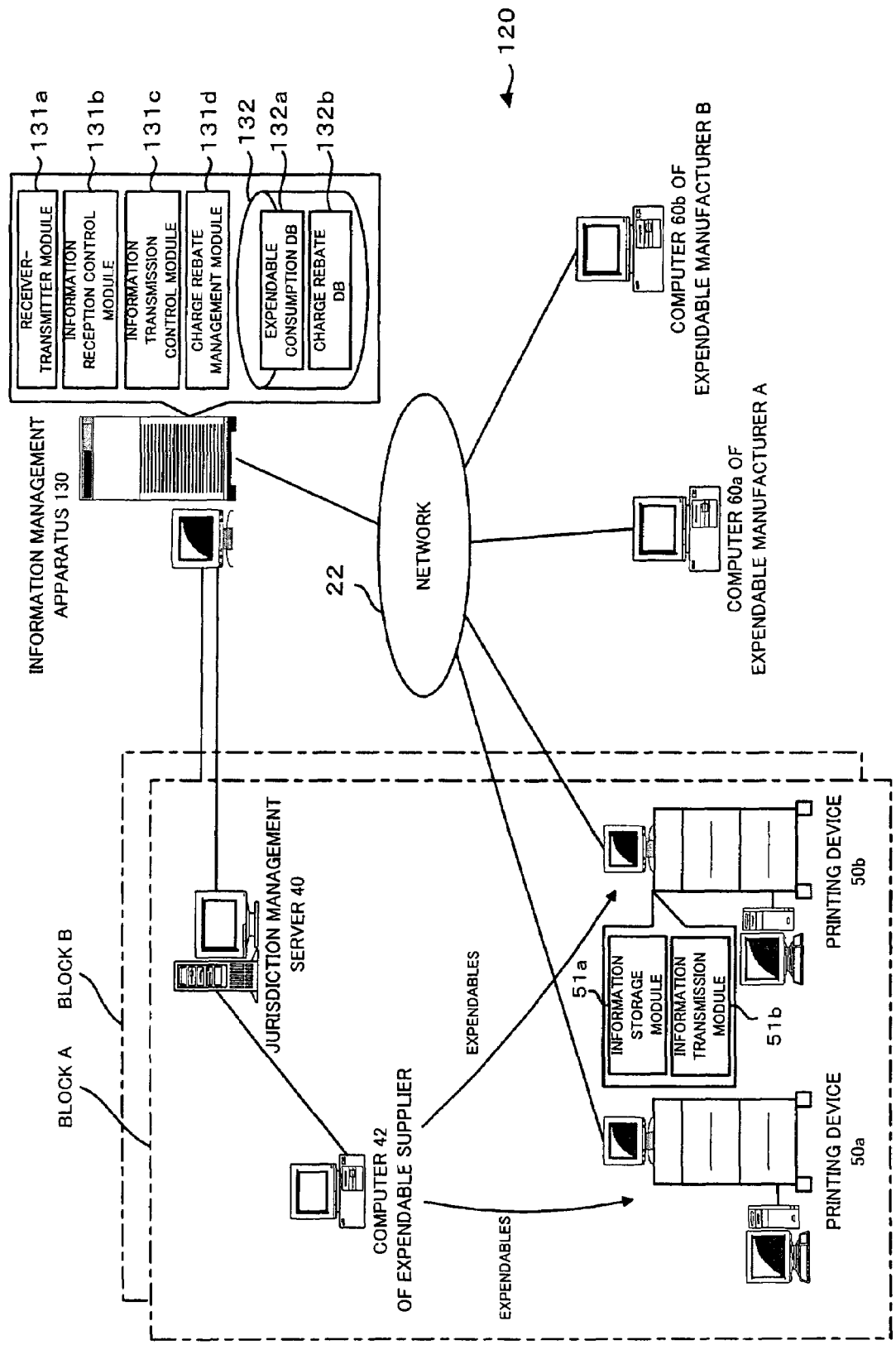
FIG. 6 schematically illustrates the construction of a printing management system 120 including an information management apparatus 130 in the second embodiment of the invention.

The following describes an information management apparatus 130 in a second embodiment of the present invention. FIG. 6 schematically illustrates the construction of a printing management system 120 including an information management apparatus 130 in the second embodiment of the invention. As illustrated, the information management apparatus 130 of the second embodiment has an external storage device 132, such as a hard disk drive, in which an expendable consumption database 132a that stores expendable consumption data in multiple printing devices 50a and 50b in the form of a database and a charge rebate database 132b that stores data used for management of charges to the printing devices 50a and 50b and rebates to expendable manufacturers are constructed. The information management apparatus 130 also includes an information reception control module 131b that receives the expendable consumption data at regular intervals via a receiver-transmitter module 131a from the multiple printing devices 50a and 50b, which are connected with the information management apparatus 130 via the network 22, and registers the received expendable consumption data into the expendable consumption database 132a, and an information transmission control module 131c that transfers the expendable consumption data registered in the expendable consumption database 132a to the jurisdiction management server 40, which manages supplies of the expendables to the multiple printing devices 50a and 50b. The information management apparatus 130 further includes a charge rebate management module 131d that calculates total charges to the printing devices 50a and 50b and total rebates to the expendable manufacturers based on the expendable consumption data, registers the calculated charges and rebates into the charge rebate database 132b, and transmits the registered charges and rebates to the jurisdiction management server 40, the printing devices 50a and 50b, and the computers 60a and 60b of the expendable manufacturers. The jurisdiction management server 40, the printing devices 50a and 50b, and the computers 60a and 60b of the expendable manufacturers have the same hardware structures as those in the printing management system 20 of the first embodiment, and are thus not specifically described here.

Like the information management apparatus 30 of the first embodiment, the information management apparatus 130 of the second embodiment executes the information input routine shown in FIG. 2 to manage the supplies of expendables to the respective printing devices 50a and 50b.

Figure 7:
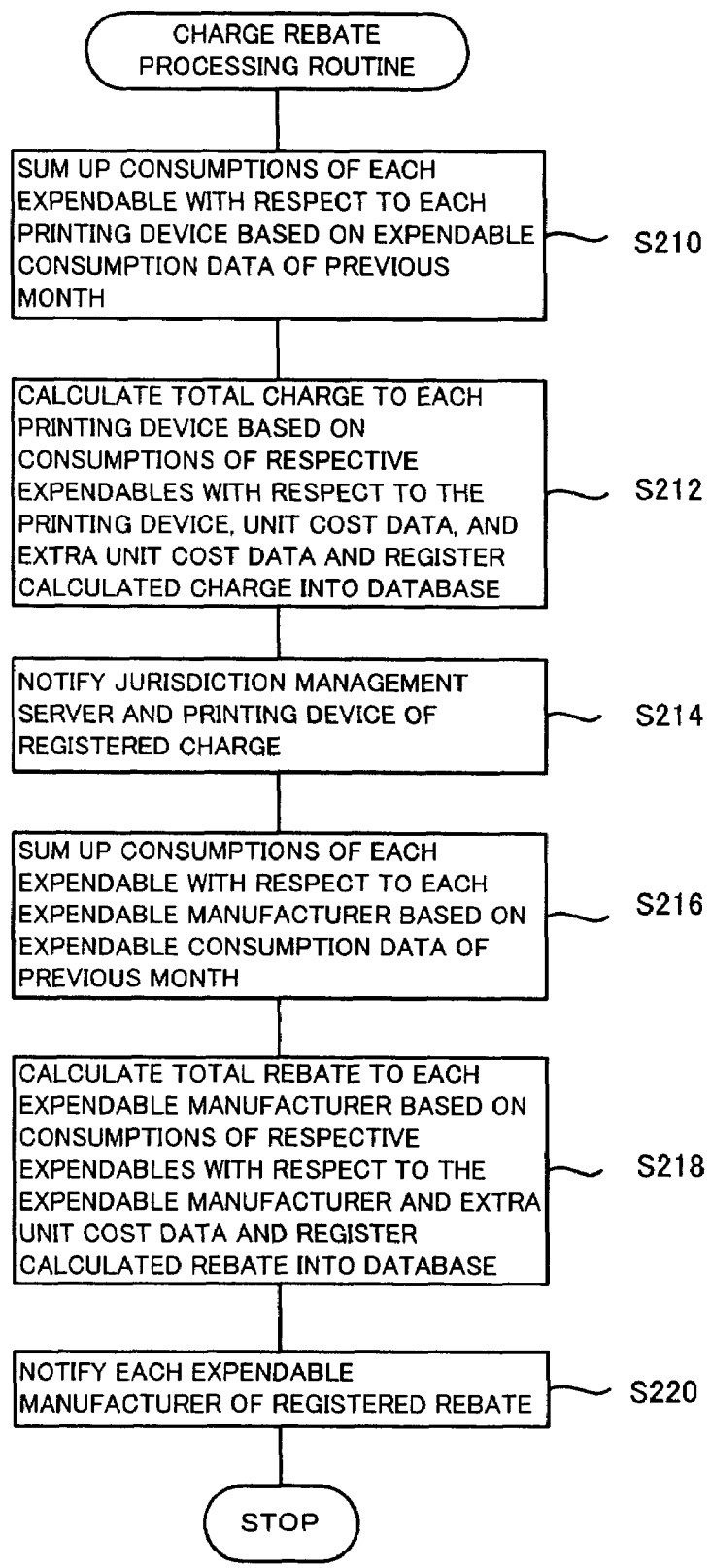
FIG. 7 is a flowchart showing a charge rebate processing routine executed by the information management apparatus 130 of the second embodiment.

The information management apparatus 130 of the second embodiment executes a charge rebate processing routine shown in FIG. 7, in place of the point setting notification routine shown in FIG. 4. This routine is carried out on the 1st day of every month. When the program enters the charge rebate processing routine, the information management apparatus 130 of the second embodiment first sums up the consumptions of each expendable with respect to each printing device identified by the printing device ID, based on the expendable consumption data of a previous month registered in the expendable consumption database 132a (step S210). For example, the procedure calculates the consumptions of printing papers with respect to the printing device 50a as * sheets of size A4 luster paper and * sheets of size A3 luster paper. The information management apparatus 130 adds each extra unit cost of extra unit cost data to each unit cost of unit cost data stored in advance in the charge rebate database 132b to calculate a total unit cost (unit cost+extract unit cost), multiplies the consumption of each expendable compiled with respect to each printing device by the total unit cost (unit cost+extra unit cost) to calculate a charge to the printing device, and registers the calculated charge as charge data into the charge rebate database 132b (step S212). FIG. 8 shows one example of the unit cost data, and FIG. 9 shows one example of the extra unit cost data. In the structure of the second embodiment, the unit cost and the extra unit cost are specified for each expendable (for each combination of the paper type and the paper size). Calculation of the charge in the second embodiment, for example, sums up the unit cost of the size A3 luster paper in the unit cost data and the extra unit cost of the size A3 luster paper in the extra unit cost data to calculate a total unit cost and multiplies the compiled consumption (number of sheets) of the size A3 luster paper by the calculated total unit cost. FIG. 10 shows one example of the charge data. As shown in FIG. 10, the charge data includes an ID for identifying the printing device (printing device ID), a data registration date when the data has been registered into the charge rebate database 132b, a total charge, and a breakdown of charges of respective expendables.

The charge data registered in the charge rebate database 132b is transmitted to the corresponding jurisdiction management server 40 and the corresponding printing device 50a or 50b connected via the network 22 (step S214).

The information management apparatus 130 then sums up the consumptions of each expendable with respect to each expendable manufacturer, based on the expendable consumption data of a previous month registered in the expendable consumption database 132a (step S216). For example, the procedure calculates the consumptions of printing papers with regard to an expendable manufacturer A as * sheets of size A4 luster paper and * sheets of size A3 luster paper. The information management apparatus 130 multiplies the consumption of each expendable compiled with regard to each expendable manufacturer by each extra unit cost of the extra unit cost data stored in the charge rebate database 132b to calculate a rebate to the expendable manufacturer and registers the calculated rebate as rebate data into the charge rebate database 132b (step S218). Calculation of the rebate in the second embodiment, for example, multiplies the compiled consumption (number of sheets) of the size A3 luster paper by the extra unit cost of the size A3 luster paper in the extra unit cost data. FIG. 11 shows one example of the rebate data. As shown in FIG. 11, the rebate data includes an ID for identifying the expendable manufacturer (expendable manufacturer ID), a data registration date when the data has been registered into the charge rebate database 132b, a total rebate, and a breakdown of rebates of respective expendables.

The rebate data registered in the charge rebate database 132b is transmitted to the computer 60a or 60b of the corresponding expendable manufacturer connected via the network 22 (step S220). The program then exits from the charge rebate processing routine. The procedure of the second embodiment gives a rebate to each expendable manufacturer according to the consumptions of the respective expendables consumed in the process of printing with the printing devices 50a and 50b. Setting the rebate in this manner encourages the expendable manufacturer to promote further consumption of the expendables and recommend printing with the printing devices 50a and 50b in the printing management system 120 of the second embodiment. Notification of the rebate to the computer 60a or 60b of the corresponding expendable manufacturer may be implemented by creation and transmission of an electronic document or by any other suitable technique.

As described above, the information management apparatus 130 of the second embodiment automatically calculates a rebate to each expendable manufacturer that manufactures expendables, based on the expendable consumption data regarding the expendables consumed in the process of printing with the multiple printing devices 50a and 50b located at different places and notifies the expendable manufacturer of the calculated rebate. The rebate given to each expendable manufacturer is set according to the consumptions of the respective expendables. This rebate setting service desirably enhances the efficiency of the system.

The information management apparatus 130 of the second embodiment calculates a total charge with respect to each printing device and a total rebate with respect to each expendable manufacturer, and transmits the calculated charge as charge data to the corresponding jurisdiction management server 40 and the corresponding printing device 50a or 50b, while transmitting the calculated rebate as rebate data to the computer 60a or 60b of the corresponding expendable manufacturer. One possible modification may not carry out calculation of the charge to each printing device but calculate only the total rebate to each expendable manufacturer and transmit the calculated rebate to the computer 60a or 60b of the corresponding expendable manufacturer. In this modified structure, the processing of steps S210 to S214 in the flowchart of FIG. 7 is not required. There are no necessities of storing the unit cost data shown in FIG. 8 into the charge rebate database 132b or registering the charge data shown in FIG. 10 into the charge rebate database 132b.

The following describes an information management apparatus 230 in a third embodiment of the present invention. The information management apparatus 230 of the third embodiment has the same structure as that of the information management apparatus 130 of the second embodiment, except that the charge rebate management module 131d has different functions. The respective constituents of the information management apparatus 230 in the third embodiment are thus expressed by the same numerals and symbols as those allocated to the constituents of the information management apparatus 130 in the second embodiment. In the information management apparatus 230 of the third embodiment, the charge rebate management module 131d calculates a total rebate to each expendable manufacturer based on the expendable consumption data, registers the calculated rebate into the charge rebate database 132b, and transmits the registered rebate to the computer 60a or 60b of the expendable manufacturer via the network 22. The jurisdiction management server 40, the printing devices 50a and 50b, and the computers 60a and 60b of the expendable manufacturers have the same hardware structures as those in the printing management system 20 of the first embodiment, and are thus not specifically described here.

Like the information management apparatuses 30 and 130 of the first and the second embodiments, the information management apparatus 230 of the third embodiment executes the information input routine shown in FIG. 2 to manage the supplies of expendables to the respective printing devices 50a and 50b.

Figure 12:
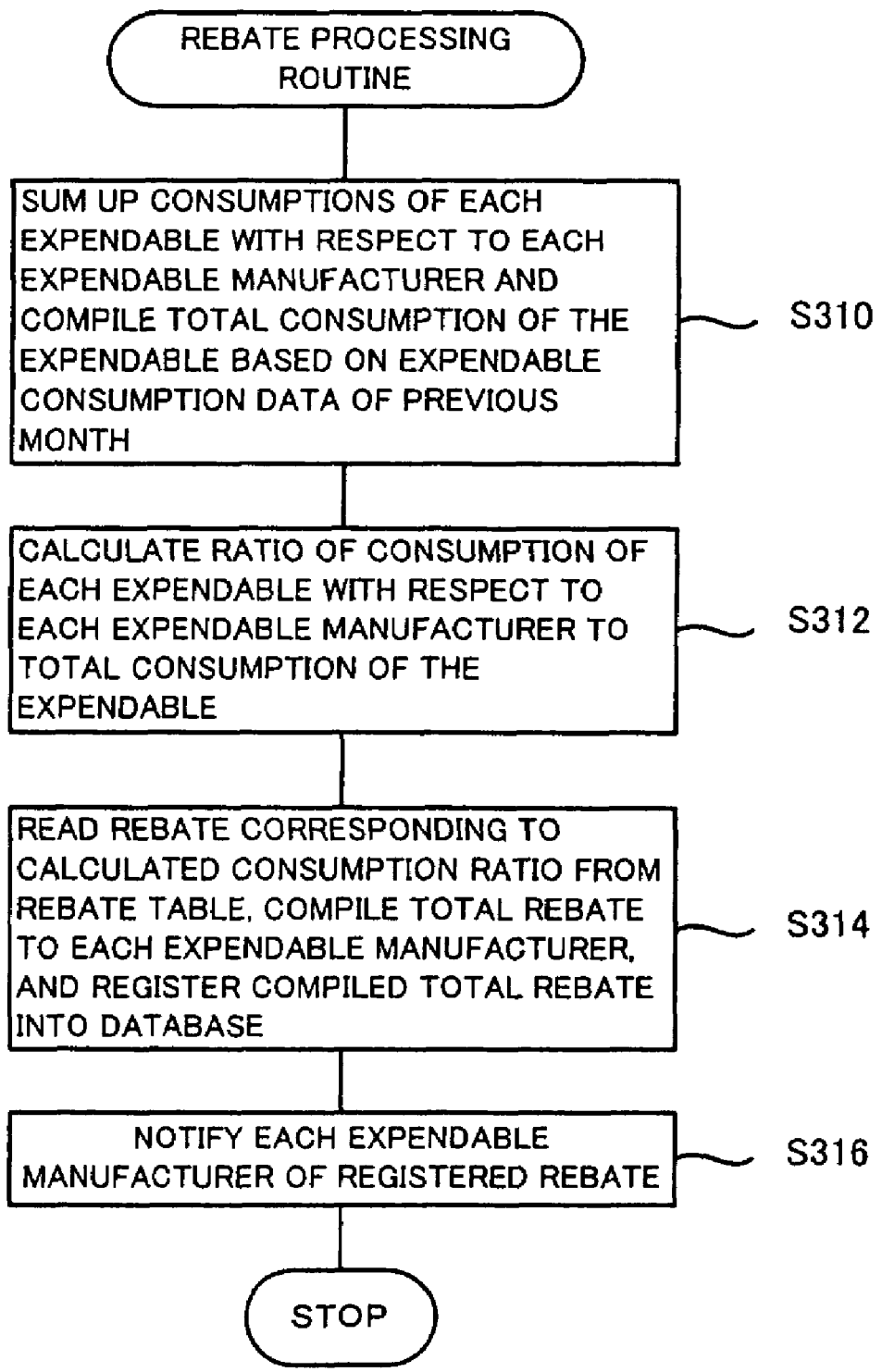
FIG. 12 is a flowchart showing a charge rebate processing routine executed by the information management apparatus 130 of the third embodiment.

The information management apparatus 230 of the third embodiment executes a rebate processing routine shown in FIG. 12, in place of the charge rebate processing routine shown in FIG. 7. This routine is carried out on the $1^{st}$ day of every month. When the program enters the rebate processing routine, the information management apparatus 230 of the third embodiment first sums up consumptions of each expendable with respect to each expendable manufacturer and compiles a total consumption of each expendable, based on the expendable consumption data of a previous month registered in the expendable consumption database 132a (step S310). For example, the procedure calculates the consumptions of printing papers with respect to an expendable manufacturer A as * sheets of size A4 luster paper and * sheets of size A3 luster paper, while compiling total consumptions of the printing papers as ** sheets of the size A4 luster paper and ** sheets of the size A3 luster paper. The information management apparatus 230 then calculates a ratio of the consumption of each expendable with respect to each expendable manufacturer to the total consumption of the expendable (hereafter referred to as consumption ratio (%))(step S312). For example, the calculation gives the consumption ratio of La/Lt×100, where Lt denotes the total consumption of the size A4 luster paper and La denotes the consumption of the size A4 luster paper with respect to the expendable manufacturer A.

The information management apparatus 230 subsequently reads a rebate corresponding to the calculated consumption ratio from a rebate table stored in advance in the charge rebate database 132b, compiles a total rebate with regard to each expendable manufacturer, and registers the compiled total rebate as rebate data into the charge rebate database 132b (step S314). FIG. 13 shows one example of the rebate table. In the illustrated rebate table of this embodiment, a rebate is set for each range of the consumption ratio with respect to each expendable. The rebate data of the third embodiment is similar to the rebate data of the second embodiment shown in FIG. 11.

The rebate data registered in the charge rebate database 132b is transmitted to the computer 60a or 60b of the corresponding expendable manufacturer connected via the network 22 (step S316). The program then exits from this rebate processing routine. The procedure of the third embodiment gives a rebate to each expendable manufacturer according to the consumptions of the respective expendables consumed in the process of printing with the printing devices 50a and 50b. Setting the rebate in this manner encourages the expendable manufacturer to promote further consumption of the expendables and recommend printing with the printing devices 50a and 50b in the printing management system 220 of the third embodiment. Notification of the rebate to the computer 60a or 60b of the corresponding expendable manufacturer may be implemented by creation and transmission of an electronic document or by any other suitable technique.

As described above, the information management apparatus 230 of the third embodiment automatically calculates a rebate to each expendable manufacturer that manufactures expendables, based on the expendable consumption data regarding the expendables consumed in the process of printing with the multiple printing devices 50a and 50b located at different places and notifies the expendable manufacturer of the calculated rebate. The rebate given to each expendable manufacturer is set according to the consumptions of the respective expendables. This rebate setting service desirably enhances the efficiency of the system.

The information management apparatus 230 of the third embodiment sets a rebate corresponding to the ratio of, for example, the consumption of luster paper of a specified size with respect to each expendable manufacturer to the total consumption of the luster paper of the specified size. One possible modification may set a rebate corresponding to the ratio of the consumption of any size of luster paper with respect to each expendable manufacturer to the total consumption of the luster paper. Another possible modification may set a rebate corresponding to the ratio of the consumption of size A4 paper of any paper type with respect to each expendable manufacturer to the total consumption of the size A4 paper. The information management apparatus 230 of the third embodiment sets a rebate corresponding to the ratio of the consumption of each printing paper with respect to each expendable manufacturer to the total consumption of the printing paper. Similarly a rebate may be set corresponding to the ratio of the consumption of each ink with respect to each expendable manufacturer to the total consumption of the ink. In general, a rebate may be set corresponding to the ratio of the consumption of each finely classified type of expendable with respect to each expendable manufacturer to the total consumption of the type of expendable, as well as corresponding to the ratio of the consumption of each moderately or roughly classified variation or class of expendable with respect to each expendable manufacturer to the total consumption of the variation or class of expendable.

The information management apparatuses 130 and 230 of the second and the third embodiments calculate a total rebate to each expendable manufacturer and notify the expendable manufacturer of the calculated rebate once a month. The frequency of calculation is not restricted to once a month, but the calculation may be performed at any desired frequency. It is not necessary to notify the expendable manufacturer of the calculated rebate every time the calculation is carried out. The notification may be carried out at another frequency at different timings.

The technique of the present invention is applied for the information management apparatuses 30, 130, and 230 that manage information regarding multiple printing devices in the above embodiments. The technique of the invention is also applicable to information management methods described above in relation to the information management apparatuses 30, 130, and 230 of the embodiments. Another application is any of programs that cause the computer to function as the information management apparatuses 30, 130, and 230 of the embodiments. Still another application is any of programs that cause the computer to execute the respective steps of the information management methods described above in relation to the information management apparatuses 30, 130, and 230 of the embodiments. In the case of such programs, the respective steps of the information input routine shown in FIG. 2, the point setting notification routine shown in FIG. 4, the charge rebate processing routine shown in FIG. 7, and the rebate processing routine shown in FIG. 12 may be programmed in a suitable programming language.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An information management apparatus for printing devices that manages a consumption status of an expendable in multiple printing devices, which are connected with said information management apparatus via a communication line, said information management apparatus comprising:

an information storage module that stores information;

a receiver-transmitter module that receives and transmits information via the communication line;

an information reception and storage control module that actuates said receiver-transmitter module to receive expendable consumption information from the multiple printing devices via the communication line and stores the received expendable consumption information into said information storage module, where the expendable consumption information includes printing device identification information used for identifying each of the multiple printing devices and consumption information regarding a consumption of each expendable consumed by each of the multiple printing devices with regard to each supply source; and a predetermined service setting control module that reads the expendable consumption information from the information storage module, sets a specification of a predetermined service to each supply source based on the consumption information on the consumption of each expendable with regard to the supply source, which is included in the read expendable consumption information, maps the setting specification of the predetermined service to the corresponding supply source, and stores the mapping into said information storage module, wherein said predetermined service setting control module sets a numerical point convertible to either of an article and money as the specification of the predetermined service.

2. An information management apparatus for printing devices, which manages a consumption status of an expendable in multiple printing devices connecting with said information management apparatus via a communication line, said information management apparatus comprising:

an expendable consumption information reception module that receives expendable consumption information regarding the expendable consumed by the multiple printing devices; and a predetermined service setting module that sets, a predetermined service to a supplier of the consumed expendable, based on the received expendable consumption information, wherein said predetermined service setting control module sets a numerical point convertible to either of an article and money as the specification of the predetermined service.

* * * * *